US009430233B2

(12) United States Patent
Gschwind et al.

(10) Patent No.: US 9,430,233 B2
(45) Date of Patent: *Aug. 30, 2016

(54) COMPILER METHOD FOR GENERATING INSTRUCTIONS FOR VECTOR OPERATIONS IN A MULTI-ENDIAN INSTRUCTION SET

(71) Applicant: International Business Machines Corporation, Armonk, NY (US)

(72) Inventors: Michael Karl Gschwind, Chappaqua, NY (US); Jin Song Ji, Pointe Vedra, FL (US); Ronald I. McIntosh, Toronto (CA); William J. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/583,691

(22) Filed: Dec. 27, 2014

(65) Prior Publication Data

US 2016/0179531 A1 Jun. 23, 2016

Related U.S. Application Data

(63) Continuation of application No. 14/576,710, filed on Dec. 19, 2014.

(51) Int. Cl.
*G06F 9/45* (2006.01)
*G06F 9/30* (2006.01)

(52) U.S. Cl.
CPC ....... *G06F 9/30036* (2013.01); *G06F 9/30043* (2013.01)

(58) Field of Classification Search
None
See application file for complete search history.

(56) References Cited

U.S. PATENT DOCUMENTS 5,828,884 A 10/1998 Lee et al.
5,968,164 A 10/1999 Loen et al.
(Continued)

FOREIGN PATENT DOCUMENTS

| GB | 002409067 B | 12/2006 |
|---|---|---|
| WO | 2007103195 A2 | 9/2007 |
| WO | 2010029794 A1 | 3/2010 |

OTHER PUBLICATIONS

Rajamohan, Srijith, "A Neural Network Based Classifier on the Cell Broadband Engine", The Pennsylvania State University, Aug. 2009.

(Continued)

*Primary Examiner* — Chuck Kendall
(74) *Attorney, Agent, or Firm* — Martin & Associates, LLC; Derek P. Martin

(57) ABSTRACT

A compiler includes a vector instruction processing mechanism that generates instructions for vector instructions in a way that assures correct operation in a bi-endian environment, wherein the processor architecture contains instructions with an inherent endian bias, along with at least one memory access instruction with a contrary endian bias. The compiler uses a code generation endian preference that matches the inherent computer system endian bias. The compiler generates instructions for vector instructions by determining whether the vector instruction has an endian bias that matches the code generation endian preference. When the endian bias of the vector instruction matches the code generation endian preference, the compiler generates one or more instructions for the vector instruction as normal. When the endian bias of the vector instruction does not match the code generation endian preference, the compiler generates instructions that include one or more vector element reverse instructions to fix the mismatch.

16 Claims, 6 Drawing Sheets

| Vector Instruction Processing Rules | 127 |
|---|---|
| For all intermediate-representation instructions that do not generate loads or stores, generate machine instruction(s) that enforce endian preference | 510 |
| For all intermediate-representation instructions that generate loads or stores that match the endian preference, generate machine instruction(s) that enforce endian preference | 520 |
| For all intermediate-representation instructions that generate loads or stores that do not match the endian preference, generate vreverse after each load and generate vreverse before each store | 530 |

(56) References Cited

U.S. PATENT DOCUMENTS

| | | | |
|---|---|---|---|
| 5,987,248 | A | 11/1999 | Murayama et al. |
| 5,996,057 | A | 11/1999 | Scales, III et al. |
| 7,552,427 | B2 | 6/2009 | Adiletta et al. |
| 7,716,642 | B1 | 5/2010 | Michael et al. |
| 8,010,953 | B2 | 8/2011 | Gschwind |
| 8,108,846 | B2 | 1/2012 | Gschwind |
| 8,255,886 | B2 | 8/2012 | Lachner |
| 8,255,891 | B2 | 8/2012 | Chen et al. |
| 8,566,645 | B2 | 10/2013 | Rentschler et al. |
| 8,725,990 | B1 | 5/2014 | Karandikar et al. |
| 9,256,505 | B2 | 2/2016 | Chakravarty |
| 2001/0049763 | A1 | 12/2001 | Barry et al. |
| 2003/0182650 | A1 | 9/2003 | Smith |
| 2004/0221274 | A1 | 11/2004 | Bross et al. |
| 2004/0268094 | A1 | 12/2004 | Abdallah et al. |
| 2005/0066146 | A1 | 3/2005 | Barry et al. |
| 2005/0125647 | A1 | 6/2005 | Symes et al. |
| 2006/0125663 | A1 | 6/2006 | Adiletta et al. |
| 2007/0226469 | A1 | 9/2007 | Wilson et al. |
| 2008/0098376 | A1 | 4/2008 | Fulton et al. |
| 2008/0288930 | A1 | 11/2008 | Chen et al. |
| 2009/0198977 | A1 | 8/2009 | Gschwind et al. |
| 2010/0042815 | A1 | 2/2010 | Gonion et al. |
| 2012/0030652 | A1 | 2/2012 | Jelinek |
| 2012/0060016 | A1 | 3/2012 | Eichenberger et al. |
| 2012/0185836 | A1 | 7/2012 | Loenko |
| 2014/0019506 | A1 | 1/2014 | Kuo |
| 2014/0201450 | A1 | 7/2014 | Haugen |
| 2015/0106793 | A1 | 4/2015 | Kahne et al. |
| 2015/0261636 | A1 | 9/2015 | Chakravarty |
| 2015/0277880 | A1* | 10/2015 | Gschwind ............ G06F 8/4435 717/159 |

OTHER PUBLICATIONS

Bailey et al., "Processor-Centric Design: Processors, Multi-Processors, and Software", Chapter 6 of ESL Models and their Applications, Embedded Systems, 2010.

Brevnov et al., "Writing a Bi-Endian Compiler", Dr. Dobb's, The World of Software Development, Jul. 2, 2012.

Gschwind et al., "Compiler Optimizations for Vector Instructions" U.S. Appl. No. 14/576,942, filed Dec. 19, 2014.

Gschwind et al., "Compiler Optimizations for Vector Instructions" U.S. Appl. No. 14/584,385, filed Dec. 29, 2014.

Gschwind et al., "Compiler Method for Generating Instructions for Vector Operations on a Multi-Endian Processor" U.S. Appl. No. 14/576,391, filed Dec. 19, 2014.

Gschwind et al., "Compiler Method for Generating Instructions for Vector Operations on a Multi-Endian Processor" U.S. Appl. No. 14/583,674, filed Dec. 27, 2014.

Gschwind et al., "Compiler Method for Generating Instructions for Vector Operations in a Multi-Endian Instruction Set" U.S. Appl. No. 14/576,710, filed Dec. 19, 2014.

List of IBM Patents or Patent Applications Treated As Related.

Gschwind et al., "Compiler Optimizations for Vector Operations That Are Reformatting-Resistant" U.S. Appl. No. 14/827,639, filed Aug. 17, 2015.

Gschwind et al., "Compiler Optimizations for Vector Operations That Are Reformatting-Resistant" U.S. Appl. No. 14/840,695, filed Aug. 31, 2015.

Gschwind et al., "Debugger Display of Vector Register Contents After Compiler Optimizations for Vector Instructions" U.S. Appl. No. 14/845,967, filed Sep. 4, 2015.

Gschwind et al., "Debugger Display of Vector Register Contents After Compiler Optimizations for Vector Instructions" U.S. Appl. No. 14/850,652, filed Sep. 10, 2015.

Rohou et al., "Vectorization Technologn to Improve Interpreter Performance", ACM Transactions on Architecture and Code Optimization, vol. 9, No. 4, Article 26, Jan. 2013.

Ziantz, LH. et al.; "Run-time optimization of sparse matrix-vector multiplication on SIMD machines"; PARLE '94. Parallel Architectures and Languages Europe. 6th International PARLE Conference Proceedings, pp. 313-322, 1994.

Software Patent Institute et al.; "Measuring User Programs for a SIMD Processor"; an IP.com Prior Art Database Technical Disclosure; http://ip.com/IPCOM/000150988; Apr. 19, 2007.

Software Patent Institute et al.; "Compiling Ordinary Programs for Execution on an Asynchronous Multiprocessor"; an IP.com Prior Art Database Technical Disclosure; http://ip.com/IPCOM/000148160; Apr. 12, 2007.

Ren, Gang, "Compiling Vector Programs for SIMD Devices", Dissertation, University of Illinois at Urbana-Champaign, 2006, retrieved from the Internet: <URL:https://www.ideals.illinois.edu/handle/2142/11226>.

* cited by examiner

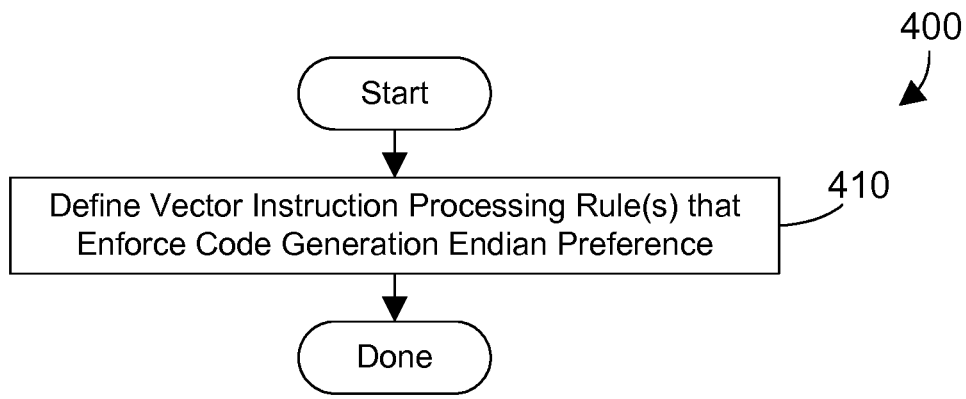

FIG. 4

| Vector Instruction Processing Rules |
|---|
| For all intermediate-representation instructions that do not generate loads or stores, generate machine instruction(s) that enforce endian preference |
| For all intermediate-representation instructions that generate loads or stores that match the endian preference, generate machine instruction(s) that enforce endian preference |
| For all intermediate-representation instructions that generate loads or stores that do not match the endian preference, generate vreverse after each load and generate vreverse before each store |

FIG. 5

```
vector unsigned char a = { 0, 1, 2, 3, 4, 5, 6, 7, 8, 9, 10, 11, 12, 13, 14, 15 };
vector unsigned short b = { 0, 1, 2, 3, 4, 5, 6, 7 };
vector unsigned char c = a;      —710
vector unsigned short d = b;     —720
```
FIG. 7
```
vload t1 = a         —810
vstore c = t1        —820
vload_hw t2 = b      —830
vstore_hw d = t2     —840
```
FIG. 8
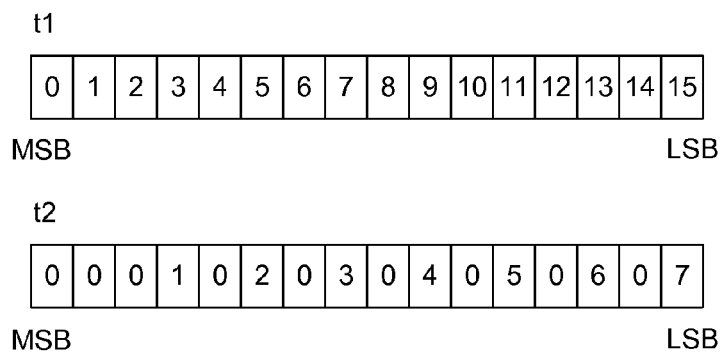
FIG. 9
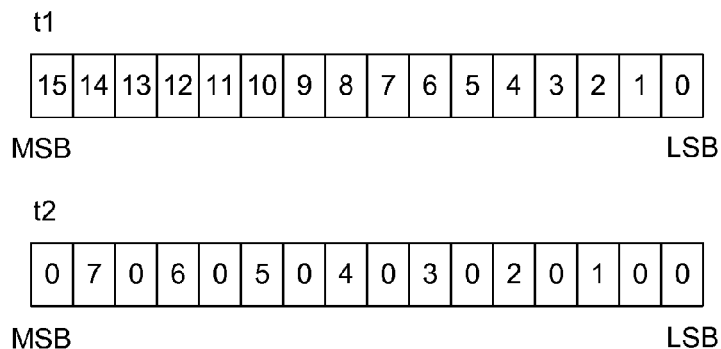
FIG. 10 vload t1 = a           — 1110
vreverse t2 = t1       — 1120
vreverse t3 = t2       — 1130
vstore c = t3          — 1140
vload_hw t4 = b        — 1150
vreverse_hw t5 = t4    — 1160
vreverse_hw t6 = t5    — 1170
vstore_hw d = t6       — 1180

FIG. 11

COMPILER METHOD FOR GENERATING INSTRUCTIONS FOR VECTOR OPERATIONS IN A MULTI-ENDIAN INSTRUCTION SET

This patent application is a continuation of U.S. Ser. No. 14,576,710 filed on Dec. 19, 2014, and is related to U.S. Ser. No. 14/576,391 filed on Dec. 19, 2014 entitled "COMPILER METHOD FOR GENERATING INSTRUCTIONS FOR VECTOR OPERATIONS ON A MULTI-ENDIAN PROCESSOR," is related to U.S. Ser. No. 14/583,674 filed on Dec. 27, 2014 entitled "COMPILER METHOD FOR GENERATING INSTRUCTIONS FOR VECTOR OPERATIONS ON A MULTI-ENDIAN PROCESSOR,", and is also related to U.S. Ser. No. 14/576,942 filed on Dec. 19, 2014 entitled "COMPILER OPTIMIZATIONS FOR VECTOR INSTRUCTIONS", all of which are incorporated herein by reference.

BACKGROUND

1. Technical Field

This disclosure generally relates to computer systems, and more specifically relates to compilers that generate code for computer systems.

2. Background Art

Computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number and complexity of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the arrangement and type of instructions within the computer program. The way compilers generate instructions thus significantly affects the run-time performance of the code generated by the compiler.

BRIEF SUMMARY

A compiler includes a vector instruction processing mechanism that generates instructions for vector instructions in a way that assures correct operation in a bi-endian environment, wherein the processor architecture contains instructions with an inherent endian bias, along with at least one memory access instruction with a contrary endian bias. The compiler uses a code generation endian preference that matches the inherent computer system endian bias. When the compiler processes a computer program, it generates instructions for vector instructions by determining whether the vector instruction has an endian bias that matches the code generation endian preference. When the endian bias of the vector instruction matches the code generation endian preference, the compiler generates one or more instructions for the vector instruction as it normally does. When the endian bias of the vector instruction does not match the code generation endian preference, the compiler generates instructions that include one or more vector element reverse instructions to fix the mismatch.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a block diagram illustrating how a byte array is stored in little endian and big endian systems;

FIG. 3 is a block diagram illustrating how a word array is stored in little endian and big endian systems;

FIG. 4 is a flow diagram of a method for defining processing rules for vector instructions that enforce a code generation endian preference;

FIG. 5 is a diagram of a table that shows examples of the vector instruction processing rules shown in FIG. 1;

FIG. 7 is a diagram showing a sample snippet of code processed by a compiler;

FIG. 8 is a diagram showing instructions generated by the compiler as a result of processing the instructions in FIG. 7 when the vector load and vector store instructions satisfy the code generation endian preference;

FIG. 9 is a block diagram illustrating how the two vector load instructions in FIG. 8 load data into registers assuming the instructions in FIG. 8 have a big endian bias;

FIG. 10 is a block diagram illustrating how the two vector load instructions in FIG. 8 load data into registers assuming the instructions in FIG. 8 have a little endian bias; and FIG. 11 is a diagram showing instructions generated by the compiler that include vector element reverse instructions that fix a mismatch between the endian bias of the instructions and the endian preference.

DETAILED DESCRIPTION

Figure 1:
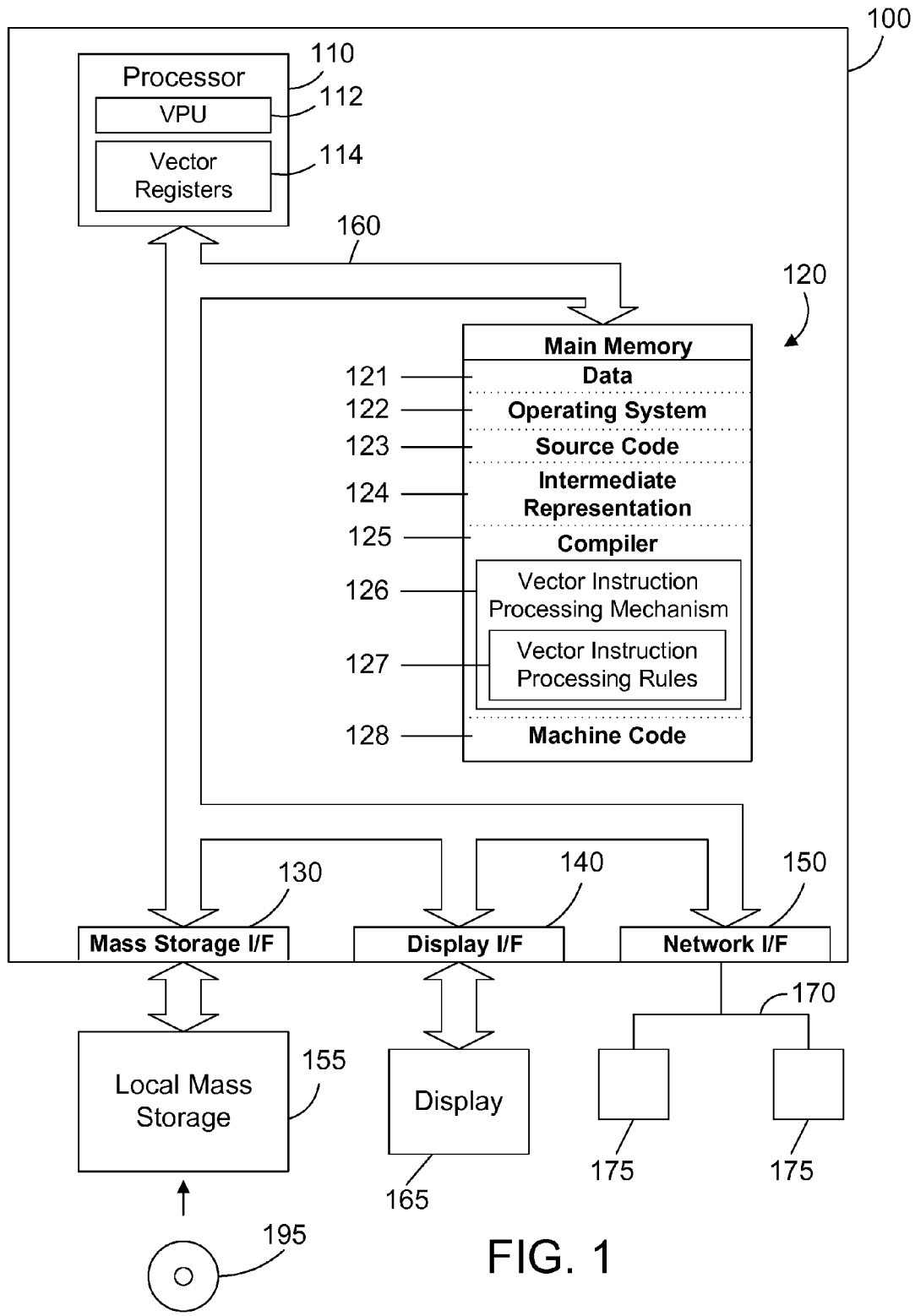
FIG. 1 is a block diagram of an apparatus that includes a vector instruction processing mechanism in a compiler.

Exploiting opportunities for parallel computation is very important for modern computing systems. One of the most common opportunities for parallel computation arises when the same operation is to be performed on an array (or "vector") of homogeneous data elements. Today's processor instruction set architectures (ISAs) usually include a set of single-instruction, multiple-data (SIMD) instructions that can operate on 2, 4, 8, 16, or 32 values simultaneously. SIMD instructions are examples of what are more broadly termed vector instructions as used herein. For example, the PowerPC ISA currently defines the Vector Add Floating-Point (vaddfp) instruction. This instruction operates on 128-bit vector registers, whose contents are interpreted as four 32-bit floating-point values. The corresponding values in each input register are added together and placed in the corresponding position in the output register. Thus four additions are performed using a single instruction.

Another aspect of today's processors is the concept of "endianness." This refers to how the processor stores bytes of a multi-byte value in memory. For example, a 64-bit integer in a machine register contains 8 bytes, arranged from most-significant byte (MSB) containing the bits representing the largest portions of the integer, to the least-significant byte (LSB) containing the bits representing the smallest portions of the integer. On a so-called Big Endian (BE) architecture, the same value is stored in memory with byte 0 containing the MSB, and byte 7 containing the LSB. On a so-called Little Endian (LE) architecture, the value is stored in memory with byte 0 containing the LSB, and byte 7 containing the MSB. These two methods arose for historical performance reasons that no longer matter a great deal, except that in today's world we must deal with these two incompatible views of memory.

BE and LE systems typically view values differently in vector registers as well. When an array of four 32-bit values is loaded into a 128-bit BE vector register, the zeroth element of the array occupies the most significant bytes, while the third element of the array (zero-based indexing) occupies the least significant bytes. When the same array is loaded into a 128-bit LE vector register, the zeroth element of the array occupies the least significant bytes, while the third element of the array occupies the most significant bytes. These are considered to be the "natural element order" for BE and LE memory models. The contents of each 4-byte element are represented in the same fashion on both BE and LE architectures, with the sign bit of the floating-point value placed in the most significant bit of the element.

Some ISAs (PowerPC and ARM, for example) are designed to operate in either Big Endian mode or in Little Endian mode. Thus the same instructions are available to carry out computation regardless of endianness. This is of no concern for instructions such as "vaddfp," described above, where the computation is performed uniformly on all elements of the instruction's input and output registers. However, when an instruction implicitly or explicitly refers to the element numbering within a vector register, the numbering that is natural for one endianness is unnatural for the other.

In some cases, an ISA may provide instructions to facilitate maintaining elements in vectors using a particular element order, regardless of the endian mode specified by the programmer. For example, the Load VSX Vector Doubleword*2 Indexed (lxvd2x) instruction in the PowerPC ISA specifically loads elements into a vector register using the BE natural element order, whether or not the machine is using the BE memory model or the LE memory model. Similarly, the Store VSX Vector Doubleword*2 Indexed (stxvd2x) reverses this transformation, storing to memory as though the elements in the vector register use the BE natural element order. Using these instructions allows a programmer to ignore the actual endian memory model in use, for a subset of data types and instructions.

An instruction that regards vector elements in vector registers using BE natural element order is said to have a BE vector element endian bias. Conversely, an instruction that regards vector elements in vector registers using LE natural element order is said to have an LE vector element endian bias. When the preponderance of vector instructions in an ISA have the same endian bias, this is referred to as the inherent endian bias of the ISA.

In bi-endian systems, there is typically a bit in the processor that specifies which endian mode the processor is running in. This disclosure applies when the processor endian mode is different than the inherent endian bias of the ISA.

For code written using this approach, the programmer's desire is to have all instructions act as though registers contain vectors in BE natural element order, regardless of the endian memory model in use. Thus there is a need for a method to facilitate porting of code to always use the vector element order for which an ISA is biased, regardless of the endian memory model.

Figures 2, 3:
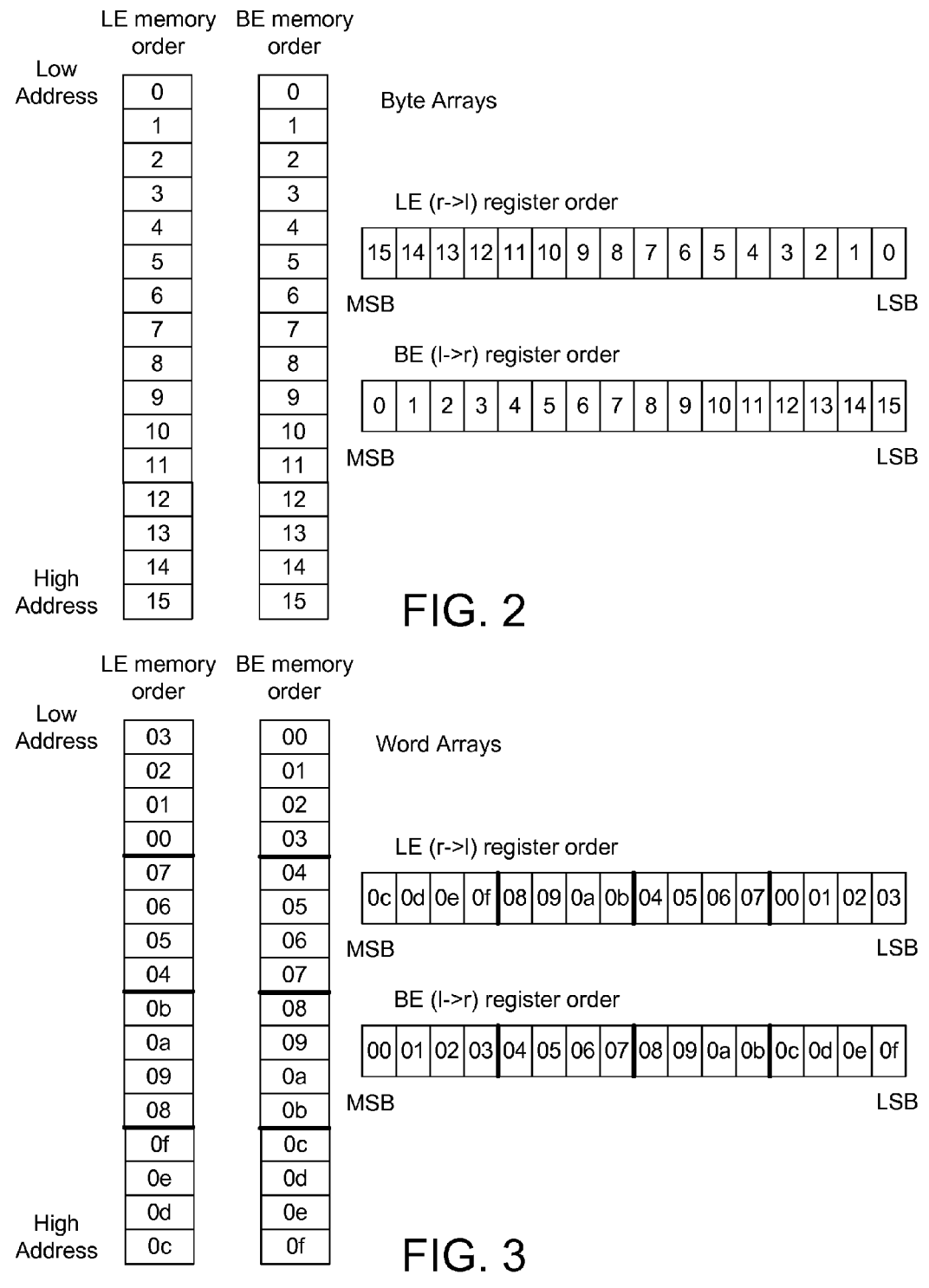

FIGS. 2 and 3 show examples of how data arrays may be represented in memory, using big-endian and little-endian data representation, and how they may be represented in vector registers, using l→r and r→l element ordering. In FIG. 2, an array of bytes containing {0, 1, ..., 15} is shown. Since each vector element is one byte long, the little-endian (LE) and big-endian (BE) representations in memory are identical, with the first element stored in the lowest address. Using r→l element ordering (LE), the first element is stored in the least significant byte (LSB) of the vector register; while using l→r element ordering (BE), the first element is stored in the most significant byte (MSB).

FIG. 3 shows representations for an array of 4-byte integers, containing {0x00010203, 0x04050607, 0x08090a0b, 0x0c0d0e0f}. In memory, elements appear in ascending address order for both BE and LE, but the byte order within each element differs. In registers, the opposite is true: the elements appear from right to left using r→l order (LE) and from left to right using l→r order (BE), but within each element the byte ordering is identical. Thus, we see the 4-byte integer stored in the least significant four bytes of the LE register are the same order, namely 00, 01, 02, 03 as the 4-byte integer stored in the most significant four bytes of the BE register. The order that changes is the order of elements, not the order of bytes within the elements.

A compiler as disclosed and claimed herein includes a vector instruction processing mechanism that generates instructions for vector instructions in a way that assures correct operation in a bi-endian environment, wherein the processor architecture contains instructions with an inherent endian bias, along with at least one memory access instruction with a contrary endian bias. The compiler uses a code generation endian preference that matches the inherent computer system endian bias. When the compiler processes a computer program, it generates instructions for vector instructions by determining whether the vector instruction has an endian bias that matches the code generation endian preference. When the endian bias of the vector instruction matches the code generation endian preference, the compiler generates one or more instructions for the vector instruction as it normally does. When the endian bias of the vector instruction does not match the code generation endian preference, the compiler generates instructions that include one or more vector element reverse instructions to fix the mismatch.

Referring to FIG. 1, a computer system 100 is one suitable implementation of a server computer system that includes a compiler with a vector instruction processing mechanism as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, source code 123, an intermediate representation 124, a compiler 125, and machine code 128. Data 121 represents any data that serves as input to or output from any program in computer system 100. Operating system 122 is a multitasking operating system. There are three different representations of a computer program in FIG. 1, namely the high-level source code 123, the intermediate representation 124 that is generated by a front-end compiler from the source code 123, and the machine code 128 that is generated by a back-end compiler from the intermediate representation 124. The vector instruction processing mechanism 126 disclosed herein could be implemented within a front-end compiler, or different aspects of the vector instruction processing mechanism 126 could be implemented in both a front-end compiler and a back-end compiler. The compiler 125 thus could represent either a front-end compiler or a full compiler that includes a front-end and a back-end. The compiler 125 includes the vector instruction processing mechanism 126 that generates instructions for vector instructions in a way that enforces an endian preference. When the endian bias of a vector instruction matches the code generation endian preference, the instructions may be generated in a normal fashion as is done in the prior art. However, when the endian bias of a vector instruction does not match the code generation endian preference, one or more vector element reverse instructions are generated and inserted into the code to fix up the mismatch between the endian bias of the vector instruction and the endian preference being enforced.

Note the source code 123, intermediate representation 124, compiler 125, and machine code 128 are all shown residing in memory 120 for the convenience of showing all of these elements in one drawing. One skilled in the art will appreciate that this is not the normal mode of operation for most compilers. A front-end compiler processes source code 123 and generates therefrom intermediate representation 124. This processing may occur on a computer system separate from computer system 100. A back-end compiler processes intermediate representation 124 and generates therefrom machine code 128, which may also occur on a separate computer system. Compiler 125 could be a front-end compiler, or could be a compiler that includes both a front end and a back end. In the extreme, source code 123 could reside on a first computer system and a front-end compiler could reside on a second computer system. The front-end compiler could read the source code 123 from the first computer system, generate the intermediate representation 124, and store the intermediate representation 124 on a third computer system. A back-end compiler could be executed on a fourth computer system, which reads the intermediate representation 124 from the third computer system, and generates therefrom machine code 128, which could be written to a fifth computer system. This simple example shows that the preferred embodiments expressly extend to any suitable configuration and number of computer systems to accomplish the front-end and back-end compiling. The "apparatus" described herein and in the claims expressly extends to a multiple computer configuration, as described by the example above. In addition, the vector instruction processing mechanism 126 can include different portions implemented in different parts of the compiler.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, source code 123, intermediate representation 124, compiler 125, and machine code 128 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the compiler 125. Processor 110 preferably includes a vector processing unit (VPU) 112 and multiple vector registers 114. The VPU 112 and vector registers 114 allow the processor to execute Single Instruction Multiple Data (SIMD) instructions, which are examples of vector instructions discussed herein.

Although computer system 100 is shown to contain only a single processor and a single system bus, those skilled in the art will appreciate that a compiler as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 4, method 400 defines one or more vector instruction processing rules that enforce the code generation endian preference (step 410). Some examples of vector processing instruction rules 127 shown in FIG. 1 are shown in FIG. 5. For all intermediate-representation vector instructions that do not generate loads or stores, one or more machine instructions that enforce the code generation endian preference are generated, as shown at 510. For all intermediate-representation vector instructions that generate loads or stores that match the code generation endian preference, one or more machine instructions that enforce the endian preference are generated, as shown at 520. For all intermediate-representation instructions that generate loads or stores that do not match the code generation endian preference, a vector element reverse (vreverse) machine instruction is added after each load and before each store, as shown at 530. A vector load instruction that has a little endian bias, and thus depends on little endian ordering of elements, does not match when the code generation endian preference is big endian. Similarly, a vector load instruction that has a big endian bias, and thus depends on big endian ordering of elements, does not match when the code generation endian preference is little endian. The same is true of vector store instructions. In one particular implementation, rules 510 and 520 in FIG. 5 result in the generation of code for the vector instructions using known compiler techniques. The insertion of one or more vector element reverse instructions according to rule 530 has not been done in the prior art, and is the subject of the disclosure and claims herein. Note the rules 127 in FIG. 5 apply only to vector instructions. We assume all other non-vector instructions are processed by the compiler in accordance with known methods in the prior art.

Figure 6:
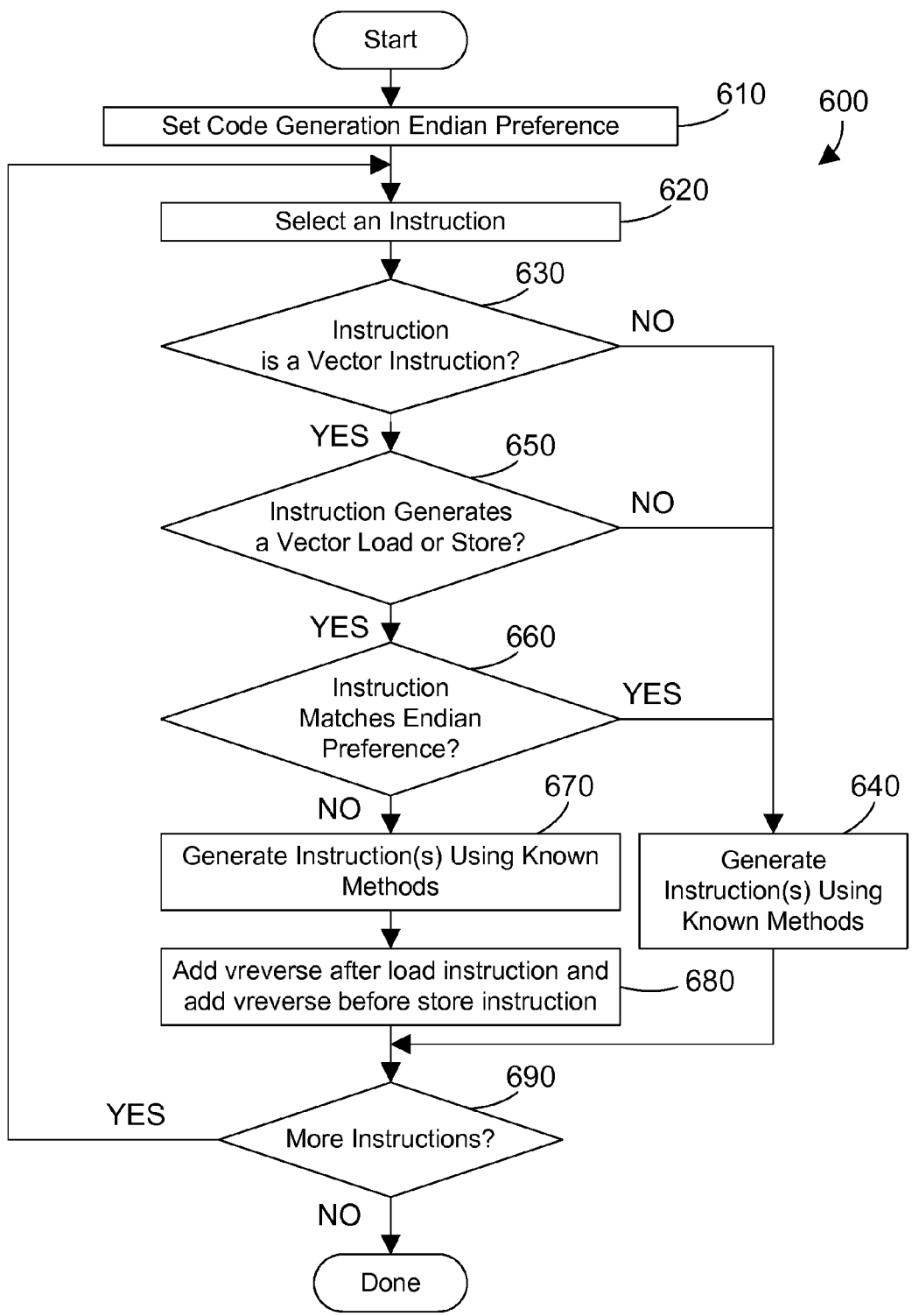
FIG. 6 is a flow diagram of a method for a compiler to process instructions based on a code generation endian preference according to the defined vector instruction processing rules shown in FIG. 5.

Referring to FIG. 6, a method 600 is preferably performed by the compiler 125 in FIG. 1. The compiler's code generation endian preference is set to the endian bias of the target instruction set architecture (step 610). In one specific implementation, this can be done by a user setting a switch in the compiler. Of course, other implementations are also possible. The compiler can now begin processing instructions. An instruction is selected (step 620). When the selected instruction is not a vector instruction (step 630=NO), one or more instructions are generated for the selected instruction using known methods (step 640). For this discussion, we assume that vector instructions include any instruction that reads from or writes to a vector register. Suitable examples of vector instructions include Single Instruction Multiple Data (SIMD) instructions. Because all other instructions that are not vector instructions do not operate on vector registers, the compiler can generate the corresponding instructions for these instructions as has been done in the prior art, which is represented in step 640 in FIG. 6.

When the selected instruction is a vector instruction (step 630=YES), but the instruction does not generate a vector load or store (step 650=NO), the compiler generates instructions for the selected instruction using known methods (step 640). When the selected instruction generates a vector load or store (step 650=YES), and when the endian bias of the selected instruction matches the code generation endian preference (step 660=YES), the compiler generates instructions for the selected instruction using known methods (step 640). When the endian bias of the selected instruction does not match the code generation endian preference (step 660=NO), instructions for the selected instruction are generated using known methods (step 670). Additionally, one or more vector element reverse instructions must be inserted to address the mismatch between the code generation endian preference and the endian bias of the instruction. This may be done by adding a vector element reverse instruction after each vector load instruction and by adding a vector element reverse instruction before each vector store instruction (step 680). When there are more instructions to process (step 690=YES), method 600 loops back to step 620 and continued until there are no more instructions to process (step 690=NO), at which point method 600 is done.

Note that FIGS. 5 and 6 are discussed in terms of instructions that "generate loads or stores." This is shorthand for indicating that the compiler, in generating machine instructions for the intermediate-representation instruction being processed, will generate a load or store (or both) in the machine instructions generated by the compiler for the intermediate-representation instruction. The instruction being processed by the compiler does not "generate loads or stores", but this terminology is used as shorthand to indicate the compiler generates for these instructions loads or stores.

An example is now presented to illustrate some of the concepts discussed above with respect to FIG. 6. This example is extremely simplified for the sake of illustration. A sample snippet of code is shown in FIG. 7, where a is defined as a vector char array of sixteen bytes while b is defined as a vector short array of eight halfwords. Two instructions are defined, namely the copy of a to c at 710 and the copy of b to d at 720 in FIG. 7. When the endian bias of the instructions matches the code generation endian preference, the instructions in FIG. 8 could be generated for the two instructions 710 and 720 in FIG. 7. Referring again to FIG. 6, we assume an endian preference is specified in step 610, and the first instruction 710 is selected in step 620. Instruction 710 is a vector instruction (step 630=YES) and generates a vector load or store instruction (step 650=YES) and we assume the endian bias of the instruction matches the code generation endian preference (step 660=YES). This means instructions 810 and 820 shown in FIG. 8 could be generated for instruction 710, which is the same way known compilers would generate instructions for instruction 710 (step 640). There is still another instruction to process (step 690=YES), so method 600 loops back to step 620, which selects instruction 720. The instruction is a vector instruction (step 630=YES), the instruction generates a vector load or store (step 650=YES), and again we assume the endian bias of the instruction matches the code generation endian preference (step 660=YES). This means instructions 830 and 840 shown in FIG. 8 could be generated for instruction 720, which is the same way known compilers would generate instructions for instruction 720 (step 640). At this point, there are no more instructions to process (step 690=NO), so method 600 is done.

When the code generation endian preference is Big Endian, after executing the loads 810 and 830 in FIG. 8, the bytes in the registers will appear as shown in FIG. 9. When the code generation endian preference is Little Endian, after executing the loads 810 and 830 in FIG. 8, the bytes in the registers will appear as shown in FIG. 10. Note that the individual elements retain the same internal byte order as for Big Endian, but the order in which the elements appear is reversed.

FIGS. 9 and 10 show how the two registers contain data in different element order depending on the endian preference and the endian bias of the instructions. When there is a mismatch, the compiler needs to generate one or more additional instructions to fix the mismatch. In the case of a load instruction that has a mismatch, the order of the elements needs to be reversed. This is done using a vector element reverse instruction. There are preferably different vector element reverse instructions for each different element size that can be specified in an instruction set. Thus, if a system defines vectors with element sizes of bytes, halfwords (2 bytes), words (4 bytes) and doublewords (8 bytes), there will be a different vector element reverse instruction for each of these. For example, a byte vector element reverse instruction could be vreverse. A halfword vector element reverse instruction could be vreverse_hw. A word vector element reverse instruction could be vreverse_w. A double word vector element reverse instruction could be vreverse_dw. Of course, any suitable syntax could be used, and any suitable number of vector element reverse instructions could be defined, depending on the element sizes defined by the instruction set, whether currently known or developed in the future. For example, a quadword vector element reverse instruction could be defined and vector element reverse instructions for elements larger than quadwords could also be defined.

When there is a mismatch between the code generation endian preference and the endian bias of the instruction being processed, the compiler must generate fix up code that reverses the order of the elements in the registers. Examining FIGS. 9 and 10 illustrates the need for different vector element reverse instructions. For a byte array, as shown at t1 in FIGS. 9 and 10, a byte vector element reverse instruction will reverse the order of all the bytes. Thus, when the order in the t1 register is as shown in FIG. 9, the resulting order in the t1 register after executing the byte vector element reverse instruction will be as shown in FIG. 10. When the order in the t1 register is as shown in FIG. 10, the resulting order in the t1 register after executing the byte vector element reverse instruction will be as shown in FIG. 9. Note, however, that simply changing the order of all the bytes will produce an incorrect result in the case of the halfword array shown in t2 in FIGS. 9 and 10. If a byte vector element reverse instruction were performed on t2 in FIG. 9, the result would not be t2 as shown in FIG. 10 because the value of 7 in the LSB in FIG. 9 would move to the MSB. This shows the need for a different halfword vector element reverse instruction that will treat halfwords as the element of interest and swap halfwords of t2 in FIG. 9 to arrive at the configuration in t2 shown in FIG. 10. Similarly, a halfword vector element reverse instruction could swap the elements in t2 in FIG. 10 to produce t2 in FIG. 9. Each different type of vector element reverse instruction thus operates on a different element size as discussed in detail above. Where there is no vector element reverse instruction for a particular element size, it can be synthesized out of a general permute or shuffle instruction, but that may be less efficient than a specific instruction.

FIG. 8 shows the code the compiler would generate when the code generation endian preference matches the endian bias of the instruction being processed. When the code generation endian preference does not match the endian bias of the instruction being processed, the compiler must insert one or more vector element reverse instructions to account for the mismatch. Assuming a mismatch exists, instead of generating the code shown in FIG. 8, the compiler would generate the code shown in FIG. 11. A vector element reverse instruction is inserted immediately after each vector load instruction and immediately before each vector store instruction. Note the type of vector element reverse instruction matches the element size being operated on by the instruction. Instructions 1110, 1140, 1150 and 1180 are very similar to instructions 810, 820, 830 and 840 shown in FIG. 8. The rest of the instructions 1120, 1130, 1160 and 1170 are vector element reverse instructions that change the order of elements in the vector register to account for the mismatch between the code generation endian preference and the endian bias of the instructions being processed. Thus, after the byte vector load instruction at 1110, a byte vector element reverse instruction is inserted at 1120. Before the byte vector store instruction at 1140, a byte vector element reverse instruction is inserted at 1130. Similarly, after the halfword vector load instruction at 1150, a halfword vector element reverse instruction is inserted at 1160, and before the halfword vector store instruction at 1180, a halfword vector element reverse instruction is inserted at 1170. The vector element reverse instructions account for a mismatch between the code generation endian preference and the endian bias of the instructions being processed. This allows the compiler to generate code that will run correctly notwithstanding the mismatch.

The ability to specify an endian preference that differs from the endian bias of the instructions being processed allows the compiler disclosed and claimed herein to easily port code written for Big Endian to a target system that is Little Endian, and vice versa. The only previously known method for fixing such a mismatch is for the programmer to manually locate and change all instructions that have the mismatch, which is a very inefficient, manual and time-consuming process. The compiler disclosed herein makes all of this effort by the programmer unnecessary because the mismatch can be accounted for by strategically inserting vector element reverse instructions as disclosed herein.

The claims and disclosure herein provide a compiler that includes a vector instruction processing mechanism that generates instructions for vector instructions in a way that assures correct operation in a bi-endian environment, wherein the processor architecture contains instructions with an inherent endian bias, along with at least one memory access instruction with a contrary endian bias. The compiler uses a code generation endian preference that matches the inherent computer system endian bias. When the compiler processes a computer program, it generates instructions for vector instructions by determining whether the vector instruction has an endian bias that matches the code generation endian preference. When the endian bias of the vector instruction matches the code generation endian preference, the compiler generates one or more instructions for the vector instruction as it normally does. When the endian bias of the vector instruction does not match the code generation endian preference, the compiler generates instructions that include one or more vector element reverse instructions to fix the mismatch.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a computer program residing in the memory, the computer program including a plurality of instructions; and
a compiler residing in the memory and executed by the at least one processor, the compiler including a code generation endian preference, the compiler including a vector instruction processing mechanism that determines when a vector instruction generates a vector load instruction that does not satisfy the code generation endian preference, and in response, adds at least one vector element reverse instruction after the vector load instruction to correct a mismatch between an endian bias of the vector load instruction and the code generation endian preference.

2. The apparatus of claim 1 wherein the vector processing mechanism further determines when the vector instruction generates a vector store instruction that does not satisfy the code generation endian preference, and in response, adds at least one vector element reverse instruction before the vector store instruction to correct a mismatch between an endian bias of the vector store instruction and the code generation endian preference.

3. The apparatus of claim 1 wherein the vector load instruction does not satisfy the code generation endian preference when the vector load instruction has a big endian bias and the code generation endian preference is little endian.

4. The apparatus of claim 1 wherein the vector load instruction does not satisfy the code generation endian preference when the vector load instruction has a little endian bias and the code generation endian preference is big endian.

5. The apparatus of claim 2 wherein the vector store instruction does not satisfy the code generation endian preference when the vector store instruction has a big endian bias and the code generation endian preference is little endian.

6. The apparatus of claim 2 wherein the vector store instruction does not satisfy the code generation endian preference when the vector store instruction has a little endian bias and the code generation endian preference is big endian.

7. The apparatus of claim 1 wherein each vector element reverse instruction reverses order of a plurality of elements of a vector register.

8. The apparatus of claim 7 wherein the plurality of elements of the vector register comprises one of:
   a plurality of bytes;
   a plurality of halfwords;
   a plurality of words;
   a plurality of double-words;
   a plurality of quadwords; and
   a plurality of elements larger than quadwords.

9. An article of manufacture comprising software stored on a computer readable storage medium, the software comprising:
   a compiler including a code generation endian preference, the compiler including a vector instruction processing mechanism that determines when a vector instruction generates a vector load instruction that does not satisfy the code generation endian preference, and in response, adds at least one vector element reverse instruction after the vector load instruction to correct a mismatch between an endian bias of the vector load instruction and the code generation endian preference.

10. The article of manufacture of claim 9 wherein the vector processing mechanism further determines when the vector instruction generates a vector store instruction that does not satisfy the code generation endian preference, and in response, adds at least one vector element reverse instruction before the vector store instruction to correct a mismatch between an endian bias of the vector store instruction and the code generation endian preference.

11. The article of manufacture of claim 9 wherein the vector load instruction does not satisfy the code generation endian preference when the vector load instruction has a big endian bias and the code generation endian preference is little endian.

12. The article of manufacture of claim 9 wherein the vector load instruction does not satisfy the code generation endian preference when the vector load instruction has a little endian bias and the code generation endian preference is big endian.

13. The article of manufacture of claim 10 wherein the vector store instruction does not satisfy the code generation endian preference when the vector store instruction has a big endian bias and the code generation endian preference is little endian.

14. The article of manufacture of claim 10 wherein the vector store instruction does not satisfy the code generation endian preference when the vector store instruction has a little endian bias and the code generation endian preference is big endian.

15. The article of manufacture of claim 9 wherein each vector element reverse instruction reverses order of a plurality of elements of a vector register.

16. The article of manufacture of claim 15 wherein the plurality of elements of the vector register comprises one of:
   a plurality of bytes;
   a plurality of halfwords;
   a plurality of words;
   a plurality of double-words;
   a plurality of quadwords; and
   a plurality of elements larger than quadwords.

* * * * *